United States Patent [19]

Wechter et al.

[11] 3,878,059

[45] Apr. 15, 1975

[54] METHOD OF CHELOMETRIC TITRATION OF METAL CATIONS USING TUNGSTEN BRONZE ELECTRODE

[75] Inventors: Margaret A. Wechter, Westport Point, Mass.; Paul B. Hahn, Malvern, Pa.

[73] Assignee: Iowa State University Research Foundation, Inc., Ames, Iowa

[22] Filed: May 28, 1974

[21] Appl. No.: 473,325

[52] U.S. Cl. ......... 204/1 T; 204/195 M; 204/195 T; 23/230 R; 23/253 R
[51] Int. Cl. .......................................... G01n 27/46
[58] Field of Search ............ 204/1 T, 195 M, 195 T; 23/230 R, 253 R

[56] References Cited
UNITED STATES PATENTS

| | | | |
|---|---|---|---|
| 3,438,871 | 4/1969 | Menichelli et al. | 204/195 T |
| 3,655,526 | 4/1972 | Christian | 204/1 T |
| 3,825,482 | 7/1974 | Wechter et al. | 204/195 M |

OTHER PUBLICATIONS

"Anal. Chim. Acta," Vol. 36 (1966), pp. 166–179.

*Primary Examiner*—T. Tung
*Attorney, Agent, or Firm*—Dawson, Tilton, Fallon & Lungmus

[57] ABSTRACT

A chelating agent of known concentration is added to a solution containing an unknown quantity of a metal cation. An electrode formed from an alkali metal tungsten bronze crystal is placed in the solution together with a reference electrode and the potential difference between the two is measured. At the end point of the titration, an abrupt and substantial negative potential shift is observed at the tungsten bronze electrode. Reverse titrations are also possible with these electrodes.

8 Claims, 5 Drawing Figures

| Metal Detected | pH | Approximate titrant (EDTA) concentration, M | Weight of metal titrated (mg) Taken | Weight of metal titrated (mg) Found |
|---|---|---|---|---|
| Ca(II) | 10 | $10^{-1}$ | 100.4 | 100.4 |
|  | 10 | $10^{-2}$ | 4.10 | 4.10 |
|  | 10 | $10^{-3}$ | 0.41 | 0.41 |
| Mg(II) | 10 | $10^{-1}$ | 62.52 | 62.56 |
|  | 10 | $10^{-2}$ | 2.50 | 2.50 |
|  | 10 | $10^{-3}$ | 0.25 | 0.25 |
| Zn(II) | 10 | $10^{-1}$ | 162.3 | 161.1 |
|  | 10 | $10^{-2}$ | 6.49 | 6.56 |
| Ca(II) ⎫ Mixture | 13 | $10^{-1}$ | 61.50 | 61.39 |
| Mg(II) ⎭ | 10 | $10^{-1}$ | 37.53 | 37.38 |
| Cu(II) | 10 | $10^{-1}$ | 146.9 | 146.5 |
| Pb(II) (reverse) | 10 | $10^{-1}$ (EDTA) $10^{-1}$ (Ca$^{2+}$) | 202 | 200 |
| Fe(III) | 3 | $10^{-1}$ | 143.1 | 143.3 |

METHOD OF CHELOMETRIC TITRATION OF METAL CATIONS USING TUNGSTEN BRONZE ELECTRODE

The invention described herein was made in the course of, or under, a contract with the U.S. Atomic Energy Commission.

BACKGROUND AND SUMMARY

The present invention relates to chelometric titrations, such as are used in quantitative analysis of metals; and more particularly, it is directed to the use of tungsten bronze electrodes for detecting the end point of a chelometric titration.

In a chelometric titration, metal cations are present in a solution, and a complexing agent or "chelating" agent is used to complex the metal ion. Typically, a colorimetric indicator is also used, and the color of the solution changes noticeably when the end point of the titration is reached. That is, after all of the metal ion has been complexed, the end point is detected by virtue of color change.

An alternative method for detecting the end point of a chelometric titration is to use an ion selective electrode in the solution together with a small trace of the metal to which the electrode is sensitive, as an indicator. For example, if calcium is being titrated with a complexing agent, a trace of copper might be placed in solution as an indicator, and a copper-sensitive electrode would also be placed in solution. As the complexing agent is added to the solution, it complexes the calcium and copper as well; and at the end point of the titration, the free copper concentration is reduced by several orders of magnitude. The copper-ion-selective electrode will then give an indication. From the amount of complexing agent that was added, the small amounts necessary to complex the known amount of copper added to the solution is subtracted, and the original calcium concentration may be calculated according to known methods from the remainder.

In the present invention, the end point of the titration may be detected directly through the use of an electrode formed of an alkali metal tungsten bronze crystal of the formula $M_xWO_3$. Electrodes of this type are known, and the manner of making them is disclosed in the copending application of Wechter et al., for "Ion-Selective Electrodes Using Tungsten Bronzes as Active Element", Ser. No. 226,862, filed Feb. 16, 1972, now U.S. Pat. No. 3,825,482. Tungsten bronze electrodes are known to be useful as catalytic electrodes in fuel cells. Further, tungsten bronze electrodes have been shown to be responsive to dissolved oxygen in aqueous solution in the copending application of Hahn et al., for "Method for Measuring Dissolved Oxygen in Aqueous Solution using Tungsten Bronzes as a Potentiometric Indicating Electrode", Ser. No. 342,682, filed Mar. 19, 1973.

The use of a tungsten bronze electrode in a chelometric titration does not require the presence of an indicator ion or other auxiliary reaction, as required in the prior art. Using the present invention, the end point for direct chelometric titrations of the divalent ions of Cu,-Ni,Co,Mn, Pb,Zn,Ca, and Mg, have all been measured directly. Further, the reverse titration of Al(III) was measured in basic solution. Some ions, Fe(III), for example, can be titrated in acid solution if another oxidation state of the metal is present as an impurity. A "reverse" titration is one in which an excess, but known amount of complexing agent is added to the solution (that is, more than enough to complex the metal ion present), and thereafter, a measured amount of another metal ion is added to be complexed by the excess amount of chelometric agent present. Knowing the exact amount of complexing agent as had been added, and the amount of the second ion added, one can compute the concentration of the measured ion.

Particularly sharp end points with substantial voltage changes have been detected using sodium tungsten bronze crystals. However, tungsten bronzes of rubidium, potassium, cesium and lithium have also been successfully employed. A typical potential shift measured at the tungsten bronze electrode as the titration nears the equivalence point will be observed in the range of 50–150 millivolts; however, in the case of Cu(II) a shift of 300–400 millivolts was observed. Thus, the present invention provides an easily observed end point indicator for chelometric titrations without having to add coloramatic indicators or other chemical indicators to the solution under test.

Other features and advantages of the present invention will be apparent to persons skilled in the art from the following detailed description of various embodiments, accompanied by the attached drawing.

THE DRAWING

DETAILED DESCRIPTION

Measuring Electrodes

Figure 1:
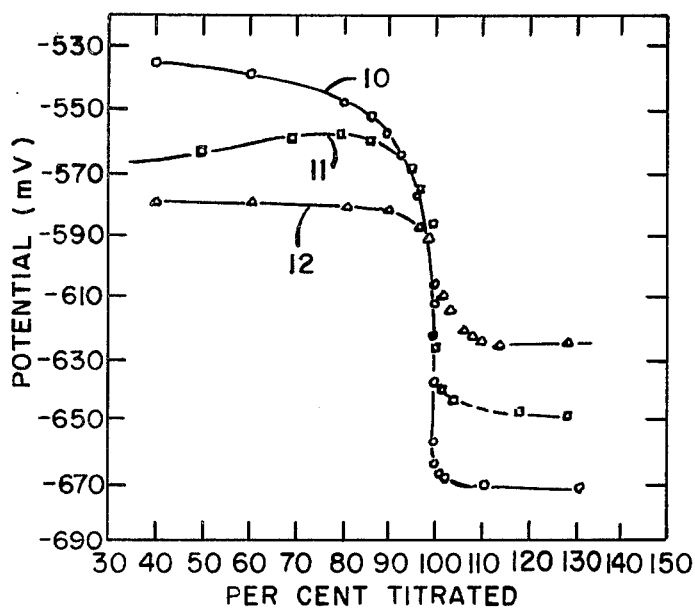
FIG. 1 is a graph showing measured electrical potential as a function of the per cent of the metal ion titrated for different concentrations of Ca(II)

Crystals of the alkali metal tungsten bronzes, $M_xWO_3$, used for measuring electrodes may be grown by the electrolysis of a melt of the metal tungstate ($M_2WO_4$) and tungstic oxide ($WO_3$). After preparation they are washed with dilute NaOH and deionized water to remove any tungstate or tungstic oxide adhering to the surface. The metal content or the x value of the bronzes may be determined prior to growing the crystal by activation analysis, the measurement of lattice parameters or by estimation on the basis of the electrolytic melt composition during preparation.

Individual electrodes may be prepared from pieces either cut with a diamond saw or chipped from larger single crystals of bronze. The cut crystals have smooth, flat surfaces, while those chipped from the parent crystal have more jagged, uneven surfaces.

To achieve a greater degree of homogeneity, the tungsten bronzes may be annealed at 650°C in an argon atmosphere for several days and cooled at the rate of 50°C/hr.

The electrodes themselves may be prepared by cementing the crystals to glass tubing with epoxy compound and making electrical contact through a mercury pool to a copper wire. The electrical resistance of each electrode is checked with an ohmmeter; those exhibiting a resistance greater than 1–2 ohms are not satisfactory. The exposed surface area of the bronze electrodes used in the Examples are estimated to vary between 0.05 and 0.2 cm². Table I lists the characteristics of the tungsten bronze electrodes used in the Examples given below. Further details on the measuring electrodes may be obtained from the above-identified application of Wechter et al., Ser. No. 226,862.

Preparation of Solutions and Chelating Agents

All solutions used in the Examples were prepared from reagent grade chemicals and deionized water.

Potentiometric measurements were made with Beckman Zeromatic SS-3 or H-5 pH meters or a Keithley Model 640 vibrating capacitor electrometer. All potential measurements were made in reference to a saturated calomel electrode (SCE).

TABLE I

| Electrode | x value | Crystal Structure | Remarks |
|---|---|---|---|
| $Na_xWO_3$ | 0.507 | cubic | chipped |
| $Na_xWO_3$ | 0.626 | cubic | chipped |
| $Na_xWO_3$ | 0.65 | cubic | cut (4×4×2mm), annealed |
| $Na_xWO_3$ | 0.718 | cubic | chipped |
| $Na_xWO_3$ | 0.81 | cubic | chipped |
| $Na_xWO_3$ | 0.907 | cubic | chipped |
| $Li_xWO_3$ | 0.35 | cubic | chipped |
| $K_xWO_3$ | 0.3 | hexagonal | chipped |
| $K_xWO_3$ | 0.5 | tetragonal | chipped |
| $Rb_xWO_3$ | 0.3 | hexagonal | chipped |
| $Cs_xWO_3$ | 0.3 | hexagonal | chipped |

Chelometric Titrations

For quantitative determinations, chelometric titrations were performed with $10^{-1}$, $10^{-2}$, or $10^{-3}M$ disodium ethylenediamine tetraacetic acid (EDTA) solutions in either 1M $NH_4OH$ or a pH 10 buffer solution (0.16M $NH_4OH$, 0.025M $NH_4Cl$). The metal solutions used in the quantitative determinations (Mg, Zn, Cu, and Fe) were made by dissolving a precisely weighed quantity of the metal in a minimum volume of 6N $HNO_3$ and diluting to 0.1M with deionized water. The EDTA solutions used in the quantitative measurements were standardized potentiometrically using a $Na_{0.65}WO_3$ electrode against a calcium solution prepared by dissolving dried $CaCO_3$ in a mimimum of $HNO_3$. The other metal solutions, used primarily to determine the general shapes of the titration curves, were made by dissolving the appropriate reagent grade chemical in deionized water.

All titrations were performed in 100–150 ml of solution which was stirred magnetically. The potential between the tungsten bronze and SCE electrodes was monitored as a function of the titrant volume. Equivalence points (i.e., 100% titrated in FIGS. 1, 4 and 5) in the quantitative measurements were determined by the second derivative method.

For the titrations involving a number of metals with high metal-EDTA stability constants in 0.1 to 1M $NH_4OH$ (pH 10–11) the electrode was a $Na_{0.65}WO_3$ electrode. Ammonium hydroxide was chosen as the titration medium over an alkali metal hydroxide in view of the increased solubility of a number of metal salts.

Direct titrations of Ca at pH 10 (0.16M $NH_4OH$-0.03M $NH_4Cl$) are shown in FIG. 1. Reference numeral 10 designates a curve for 100 mg. of Ca(II) with $10^{-1}M$ EDTA; numeral 11 designates a similar curve for 4.10 mg. of Ca(II) with $10^{-2}M$ EDTA; and numeral 12 designates a similar curve for 0.41 mg. Ca(II) with $10^{-3}M$ EDTA. Similar results were observed for Mg samples of like concentration. In both cases, end point potential shifts of −50 to −100 mV were realized when 2.5 millimoles of metal were titrated with 0.1M EDTA. Analytically useful curves were obtained for as little as 0.01 millimole of metal when titrated with $10^{-3}M$ EDTA. It was also found possible to accurately determine both calcium and magnesium in a mixture by titrating for Ca at pH 13 where Mg was precipitated as the hydroxide and then titrating for Ca + Mg at pH 10 where Mg is soluble.

The simultaneous titration of $Ca^{2+}$ and $Mg^{2+}$ was performed by first adjusting the pH to greater than 13 with 8M NaOH to precipitate $Mg(OH)_2$ and titrating for the $Ca^{2+}$ end point. The precipitate was then dissolved with 6M HCl, the solution buffered to pH 10 and titrated to the $Ca^{2+} + Mg^{2+}$ end point. Excellent titration curves were also obtained for Ni(II), Mn(II), Cu(II), Cd(II) and Co(II) in ammoniacal solution.

Reverse titrations of excess EDTA with calcium gave extremely good potentiometric "end" or "equivalence" points when monitored with a $Na_{0.65}WO_3$ electrode. Reverse titrations involving Zn(II) and Pb(II) exhibited significantly sharper potential breaks at the end point than the corresponding direct titration. The poor end points in the direct titrations of these metals are probably a result of slow reactions between the EDTA and the $Pb(OH)_2$ precipitate or the strong $Zn(NH_3)_4^{2+}$ complex which exists before the equivalence point.

In the reverse titrations, excess EDTA was added to the solution containing the metal ion and the excess EDTA was titrated with a 0.1M $CaCl_2$ solution.

Figure 2:
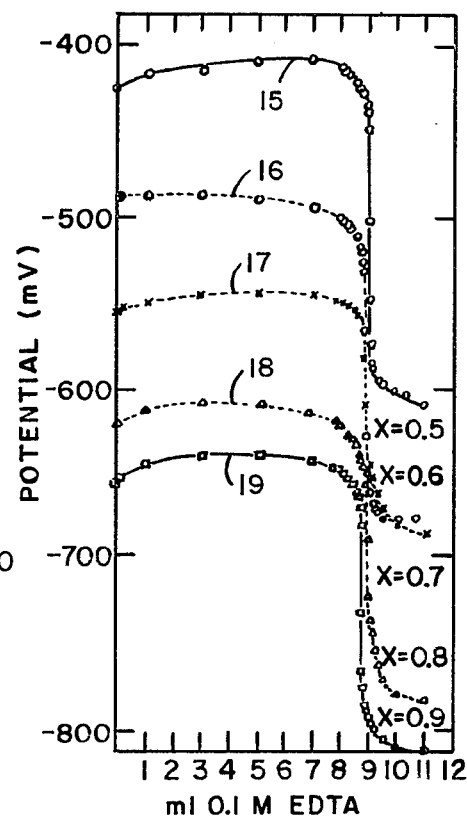
FIG. 2 is a series of plots of measured voltage for chelometric titrations of Ca(II) using sodium tungsten bronze as the electrode with different values of x.

The titration of Cu(II) was also similar, but better in the sense that an extremely large potential shift of 300–400 mV. was observed at and near the equivalence point instead of the usual 50–150 mV shift experienced with the other metals. Cubic sodium tungsten bronzes with x values between 0.5 and 0.9 were all found to give excellent end points for the titration of calcium with EDTA, see FIG. 2. In FIG. 2, the curve shows the potential at the tungsten bronze electrode during the titration of 1 millimole of calcium in 1M $NH_4OH$ as a function of the x value in the $Na_xWO_3$ electrode—that is, the curves 15, 16, 17, 18 and 19 are respectively for x values of 0.5, 0.6, 0.7, 0.8 and 0.9. Titration curves for other metals using $Na_xWO_3$ electrodes with $0.5 < x < 0.9$ can be expected to parallel those disclosed above for the $Na_{0.65}WO_3$ electrode.

Figure 3:
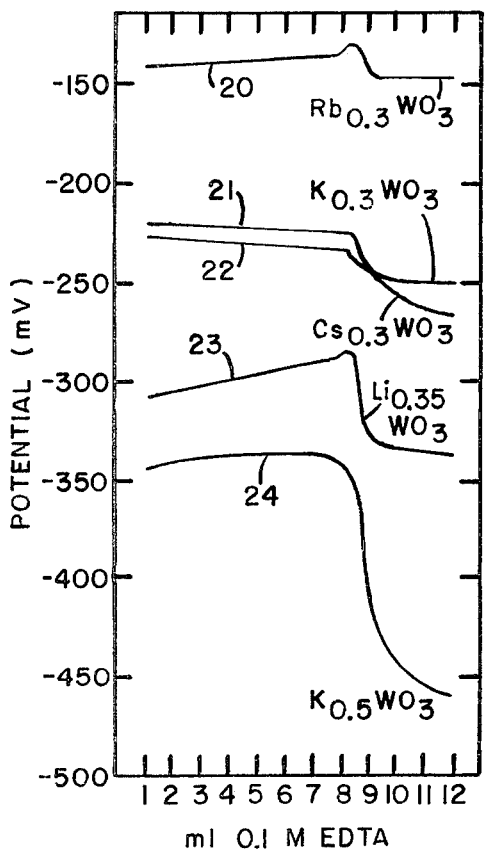
FIG. 3 is a graph showing a series of EDTA-Ca(II) titration curves using different alkali metal tungsten bronze electrodes.

The cubic sodium tungsten bronzes are preferred over other alkali metal tungsten bronzes in chelometric titrations. FIG. 3 illustrates curves for potentiometric titrations of 1 millimole of $Ca^{2+}$ with 0.1M EDTA in 1M $NH_4OH$ using hexagonal Rb (curve 20), Cs(21), and K (22), cubic Li (23), and tetragonal K (24) tungsten bronze electrodes.

The unique properties of cubic $Na_xWO_3$ are further emphasized when compared to some common metals as indicating electrodes. Potentiometric titrations of calcium with EDTA using Pt, Cu and W as the indicating electrodes yield potential breaks which were much smaller, 10–30 mV, and generally much less sharp than the breaks obtained at the same concentration of reagents with a $Na_xWO_3$ electrode.

Figure 4:
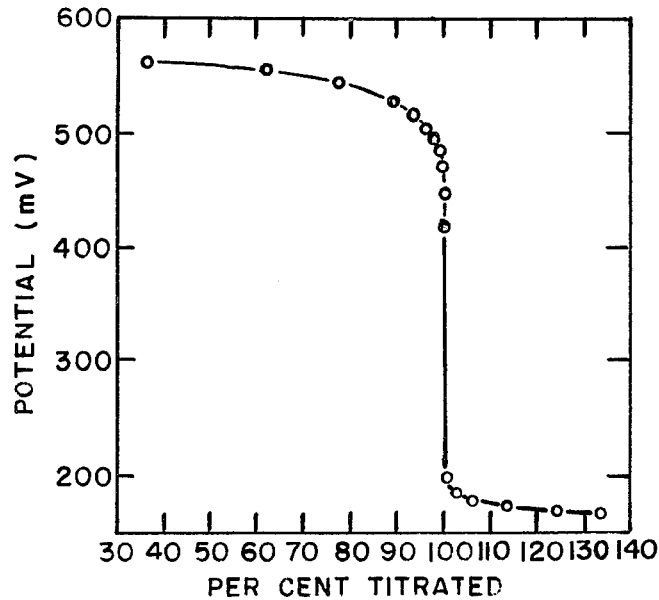
FIG. 4 is a titration curve of Fe(III) using a tungsten bronze electrode.

In acid solution the response $Na_xWO_3$ electrode was typical of a highly conducting inert electrode. The reverse titration of approximately 2.5 millimoles of Fe(III) with 0.1M EDTA at pH 2–3 is shown in FIG. 4. The large potential change (at positive potential) reflects the change in the concentration ratio of the Fe(III)/Fe(II) redox couple and is much like that obtained with a platinum-indicating electrode.

Figures 5, 6:
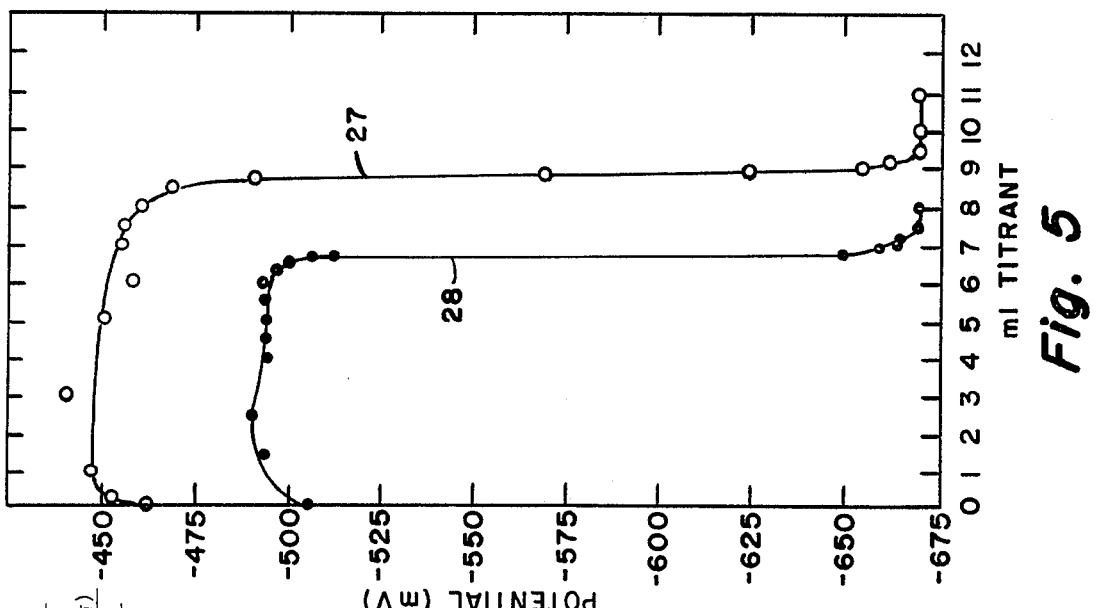
FIG. 5 is a plot showing titration curves for different chelating agents.
FIG. 6 is a table illustrating the results of various metal chelometric titrations.

Quantitative results from a number of titrations described in this section are presented in FIG. 6. All titrations shown there were performed with an annealed, flat-surface cubic $Na_{0.65}WO_3$ indicating electrode and a SCE reference electrode. End points were determined by the second derivative method. Excellent agreement is seen between quantities taken and the measured value for even the most dilute titrations where 0.01 millimole of metal was titrated with $10^{-3}$M EDTA. Excellent results were also obtained for the simultaneous titration of Ca and Mg in a mixture and for Pb(II) by reverse titration.

For the reverse titration of Al(III), the procedure was modified slightly from that described previously. Excess EDTA was added to the solution containing the metal ion. The solution was boiled, cooled, buffered to pH 10 and rapidly titrated with Ca(II).

Although the tungsten bronze electrode is highly sensitive to dissolved oxygen, oxygen does not interfere with the metal ion titrations. The only effect resulting from de-aeration is to shift the potential of the entire titration curve toward a more negative value. It is important, however, that consistent, rapid stirring be maintained during the course of titration in these instances.

Turning now to FIG. 5, reference numerals 27 and 28 denote two titration curves using $Na_xWO_3$ indicating electrode and a saturated calomel reference electrode, but with different chelometric agents. In these instances, $10^{-2}$M of Ca(II) in 1M $NH_3$ was titrated with 0.1M titrant. For curve 27, the chelating agent was EGTA (ethyleneglycol bis(amino ethylether) tetraacetic acid); and in the case of curve 28, the chelating agent was DTPA(pentasodium diethylenetriamine pentaacetate). Similar results can be expected to be found using chelating agents of this type—which are generically referred to herein as "polycarboxylate derivatives of organic amines". Another specific example is NTA (nitrilotriacetic acid).

Having thus described various examples of the invention, the utility of tungsten bronze crystals as the indicating electrode in potentiometric chelometric titrations has been demonstrated. Further, this has been accomplished with the use of colorimetric agents and without the addition of extraneous specific ions. Persons skilled in the art will appreciate that other complexing agents and materials may be substituted for those disclosed and that the invention may be useful on other metallic cations; and it is, therefore, intended that all such modifications and substitutions be covered as they are embraced within the spirit and scope of the appended claims.

We claim:

1. In a method of chelometric titration of a known volume of solution containing an unknown concentration of a metal ion, the steps comprising: contacting the solution with an indicating electrode comprising a tungsten bronze crystal of the formula $A_xWO_3$ wherein A is an alkali metal and $x$ is greater than 0 and less than 1; contacting said solution with a reference electrode; adding a chelating agent of known concentration in measured volume to said solution to complex said metal ion, said chelating agent being a polycarboxylate derivative of an organic amine and said indicating electrode being responsive to the presence of said chelating agent; and measuring the voltage between said electrodes, an abrupt and substantial change in said voltage being representative of the equivalence point of said titration.

2. The method of claim 1 wherein said indicating electrode is sodium tungsten bronze.

3. The method of claim 2 wherein said value of $x$ is approximately 0.65.

4. The method of claim 1 wherein said alkali metal is selected from the group consisting of Rb, K, Cs, Li, and Na.

5. The method of claim 1 wherein said metal ion is a divalent ion and said metal is selected from the group consisting of Ca, Mg, Zn, Ni, Cd, and Mn.

6. The method of claim 1 wherein said metal ion is selected from the group consisting of Pb(II), Fe(III), and Al(III), and wherein said method further comprises adding excess amount of chelating agent and then adding a second metal, in measured amount, to complex the excess amount of chelating agent for reverse titration.

7. The method of claim 1 wherein said chelating agent is selected from the group consisting of EDTA, EGTA, DPTA, and NTA.

8. In a method of chelometric titration, the steps comprising providing a known volume of a solution containing an unknown concentration of a divalent metal ion selected from the group consisting of calcium, magnesium, nickel, manganese, copper, cadmium, cobalt, zinc and lead; contacting said solution with an indicating electrode and a measuring electrode, said indicating electrode being a sodium tungsten bronze crystal; having a measured volume of known concentration of a polycarboxylate derivative of an organic amine to complex said metal ion; measuring the voltage between said electrode; and recording the amount of said complexing material when said voltage exhibits an abrupt and substantial change representative of the equivalence point of said titration.

* * * * *